US011580500B2

United States Patent
Coats

(10) Patent No.: US 11,580,500 B2
(45) Date of Patent: Feb. 14, 2023

(54) PROCESS AND METHOD FOR COST AND TIME OPTIMIZATION OF BACKGROUND INVESTIGATION OF EMPLOYMENT APPLICANTS

(71) Applicant: Kentech Consulting, Inc., Chicago, IL (US)

(72) Inventor: Kenneth Coats, Chicago, IL (US)

(73) Assignee: Kentech Consulting, Inc., Chicago, IL (US)

(*) Notice: Subject to any disclaimer, the term of this patent is extended or adjusted under 35 U.S.C. 154(b) by 503 days.

(21) Appl. No.: 15/957,018

(22) Filed: Apr. 19, 2018

(65) Prior Publication Data

US 2019/0325397 A1 Oct. 24, 2019

(51) Int. Cl.
G06Q 50/26 (2012.01)
G06Q 10/10 (2012.01)
G06Q 10/1053 (2023.01)

(52) U.S. Cl.
CPC ......... *G06Q 10/1053* (2013.01); *G06Q 50/26* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,682,806 | B1* | 3/2014 | Cate | G06Q 10/1053 705/321 |
| 9,070,098 | B2* | 6/2015 | Miller | G06Q 10/10 |
| 9,959,525 | B2* | 5/2018 | Chen | G06Q 10/1053 |
| 10,325,327 | B2* | 6/2019 | Wenglorz | G06Q 30/0267 |
| 10,574,692 | B2* | 2/2020 | Drake | H04W 12/02 |
| 2004/0107112 | A1* | 6/2004 | Cotter | G06Q 30/02 705/321 |
| 2004/0186852 | A1* | 9/2004 | Rosen | G06Q 30/02 |
| 2005/0055231 | A1* | 3/2005 | Lee | G06Q 99/00 705/319 |
| 2006/0287970 | A1* | 12/2006 | Chess | G06Q 10/10 |
| 2008/0052098 | A1* | 2/2008 | Malnati | G06Q 10/06 705/321 |
| 2010/0211601 | A1* | 8/2010 | Gaitas | G06Q 50/10 707/770 |

(Continued)

OTHER PUBLICATIONS

Evanthia Faliagka, Athanasios Tsakalidis, Giannis Tzimas, (2012),"An integrated e-recruitment system for automated personality mining and applicant ranking", Internet Research, vol. 22 Iss: 5 pp. 551-568 http://dx.doi.org/10.1108/10662241211271545 (Year: 2012).*

(Continued)

*Primary Examiner* — Sangeeta Bahl
*Assistant Examiner* — Rebecca R Novak
(74) *Attorney, Agent, or Firm* — Duane Morris LLP

(57) ABSTRACT

This invention relates to the field of labor and employment, and more specifically the process and method of conducting background investigations, clearance searches, and other employee-related qualification of individuals or job applicants, and the creation of different tools and indexes linked with such process and optimization scheme. The system utilizes biometric feedback from an applicant, a downloadable App to be used at the applicant's device and the integration of tokens and statistical scores and ratings to help improve and lower the cost of the process.

2 Claims, 10 Drawing Sheets

(56) References Cited

U.S. PATENT DOCUMENTS

| | | | | |
|---|---|---|---|---|
| 2012/0095933 A1* | 4/2012 | Goldberg | .............. | G06F 16/353 |
| | | | | 705/321 |
| 2013/0339220 A1* | 12/2013 | Kremen | ................ | G06Q 40/06 |
| | | | | 705/38 |
| 2014/0358813 A1* | 12/2014 | Kim | ................... | G06Q 50/2053 |
| | | | | 705/327 |
| 2015/0006422 A1* | 1/2015 | Carter | ................ | G06Q 10/1053 |
| | | | | 705/321 |
| 2015/0112882 A1* | 4/2015 | Agrawal | ............ | G06Q 10/1053 |
| | | | | 705/321 |
| 2017/0061382 A1* | 3/2017 | Zhang | ................ | G06Q 10/1053 |
| 2018/0293681 A1* | 10/2018 | Larowe | .............. | G06F 16/9535 |
| 2019/0295040 A1* | 9/2019 | Clines | ................ | G06F 16/9535 |
| 2019/0311329 A1* | 10/2019 | Clines | ................ | G06Q 10/1053 |

OTHER PUBLICATIONS

Truthfinder, "Public Records Search Website Announces Release of IOS App", Nov. 28, 2017, https://www.truthfinder.help/press/truthfinder-ios-app-release (Year: 2017).*

* cited by examiner

PROCESS AND METHOD FOR COST AND TIME OPTIMIZATION OF BACKGROUND INVESTIGATION OF EMPLOYMENT APPLICANTS

FIELD OF THE INVENTION

This invention relates to the field of labor and employment, and more specifically the process and method of conducting background investigations, clearance searches, and other employee-related qualification of individuals or job applicants, and the creation of different tools and indexes linked with such process and optimization scheme.

BRIEF DESCRIPTION OF THE DRAWINGS

The features of the present disclosure are believed to be novel and are set forth with particularity in the appended claims. The disclosure may best be understood by reference to the following description, taken in conjunction with the accompanying drawings, and the figures that employ like reference numerals to identify like elements.

BACKGROUND

The Early Hiring Process

Figure 1:
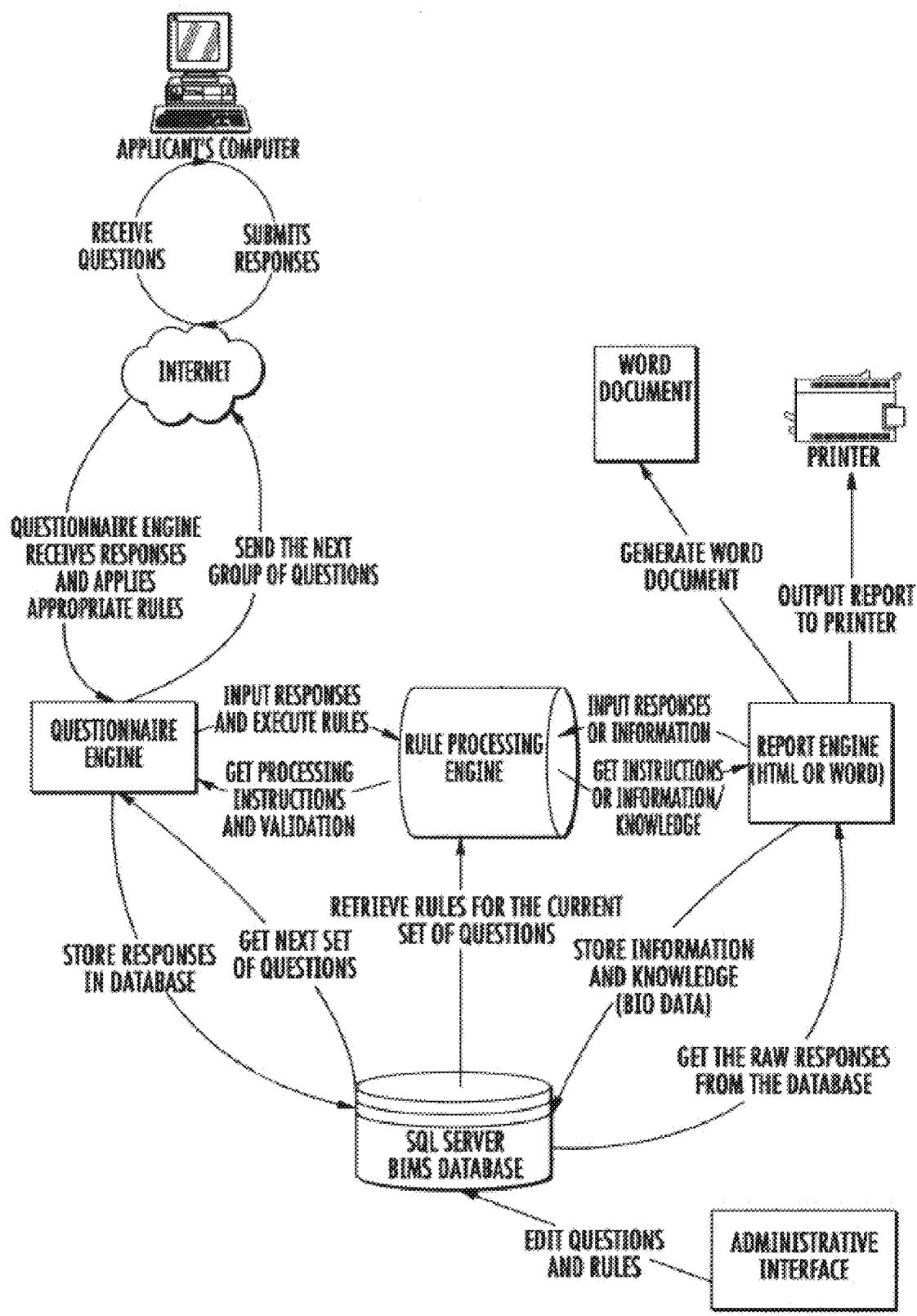
FIG. 1 is a first illustration from the Prior Art.

As part of human interaction and social conduct, individuals need others to live, socialize, and work. Early in human culture, agriculture and trade were often conducted by merchants who relied mostly on word of mouth to hire. Since families were very large, people preferentially hired family members or people who orbited in the direct proximity of these family members. With time, the size of corporations and other business association grew. Boat captains began hiring tens of thousands of people to a point at which the pool of known workers vanished.

The next level of research is linked with common features between the person in charge of hiring and the potential worker. The employer would be confident in the worthiness of a potential hire by finding this person to be a member of someone else's family, to come from a known village, or to be a member of some known association. For example, if a person was a patron of a known pub, either the person in charge of hiring trusted all patrons from that establishment or was able that same night to go to that location and enquire about the worthiness of that individual. Early background checks were often conducted in a personal way by the person who desired to hire.

With time, social conduct evolved along with the mobility of individuals forming societies. People began to move, travel and change locations. The fabric of life became more complex, and the skills of individuals became more specialized. Families also shrank and corporations began to hire hundreds of people under a common brand. Past models of vetting individuals for different jobs slowly became obsolete in many areas of modern life. What was required was a simple, cost efficient way to check verify the worthiness of a person for any given task.

In the 20th Century, before information flowed extensively over the digital airwaves, those who hired used a resume, school qualifications, prior work experience, and sometimes references. A resume was created by each applicant for a job opening, listing the above information in a clear and succinct way. Human resources department of corporations would create job postings asking applicants to apply and send their resumes. The communication between human resources and applicants often was done using newspapers. For example, for decades one day out of the week all local editions included a section with job postings. Applicants would buy the newspaper and look at the ad section. One of the ways of advertising available retail jobs was using a simple "apply within" sign placed in one of the windows" ". But one piece of this process which never was circumvented is the one-on-one connection. Interviews were used, even after qualifications were matched to help give a potential employer assurances as to the "good character" of the person to be hired.

Around 1990, the Internet arrived. With the digital highway, communication began to flow much more easily and quickly. Systems were quickly developed which allowed the process of hiring to become more transparent, efficient, and rapid, but this created multiple problems. First, the number of applicants began to increase dramatically as people from further away were able to see the ad and respond to it digitally. Second, with the click of a button, applicants were able to customize resumes to some extent to better match job posting requirements. In addition, with the ease in communication came an ease in changing a working position. The horizontal mobility of workers began to increase and good employees quickly were able to move to other positions.

Another important change in the societal dynamic took place around 2010 when the power of the Internet was made much stronger as it spread to portable devices capable of fully leveraging smaller screens. Using Apps, video chats, and other systems, the world of communication changed. People began to generate enormous and uncontrolled amounts of data. Individuals began using social media, for example, to post political opinions, minor daily events, and all sorts of personal information. Each government agency as well as, every large corporation began to collect and manage incredibly large amounts of information. Borders also melted away as workers in different countries began to see cross-border opportunities.

In sum, with early systems, the simple process of hiring always included a component as to the moral fiber of a person by either knowing them personally, knowing their loved ones or having some societal connection with that person; in the new age of technology, most often that capacity was lost.

The Heightened Process of Verification

The late 20th and early 21st Centuries' increased flow of digital information allows human resources departments to quickly verify and match job requirements with the qualifications of a candidate. Yet in today's world, the overflow of available information has only increased the demand on employers to secure the right candidates and open the analysis from other angles. Human resources departments are tasked with making sure the candidates who are interviewed meet a higher standard of quality.

Three of the main tools used by human resources include the capacity (i) to request a drug test of a candidate to make sure the candidate is not—at that moment—a user of illegal substances in violation of the law; (ii) to secure a credit report of a candidate which often will indicate certain propensities of a candidate to live with financial responsibility, (for example, people with assets and good financial management are more likely not to have gambling or addition problems); and (iii) to ask whether there is a criminal record. As one can imagine, while these three tools offer some level of guidance to human resources, they may be difficult to secure, may be partial at best because of jurisdictional issues and in the case of people with sufficient resources, not disclose the full picture.

Background Investigation & Prior Art

A background check or background investigation is often described as the process of looking up and compiling criminal records, commercial records, and financial records of an individual or organization. Once these checks were reserved to individuals with a high security clearance granted by the government; today the need for background checks has been broadened to many individuals in positions of trust or power, such as school courthouse, hospital, financial institution, legal firms, airport, or government employees. As one can imagine, background checks, while useful and desired by many, are costly. As explained above, thanks to the Internet and the information highway, the number of qualified applicants for each position has greatly increased. As a consequence, the desire to implement background checks on multiple applicants greatly burdens the process in terms of time, effort, information, and cost.

In 2000, Mr. Michael J. Cuttler et al. invented a new system, method and computer-readable medium for acquiring and analyzing personal history information. A patent was issued as U.S. Pat. No. 7,346,541 in 2008, to Law Enforcement Services, Inc. The general figure illustrating the hardware of this system is shown at FIG. 1. This technology, as protected, covers a computer-based method of acquiring life history information of an applicant to minimize positive response bias to and enhance the veracity of the life history information. This technology, as described, is designed to use the power of a database, a questionnaire engine, and a rule-processing engine to allow an administrator to edit questions and allow the system to quickly adapt (as would and interviewer) to responses given in real time by an applicant. This technology used a report engine (HTML or text processing) to manage a dynamically moving applicant questionnaire.

In 2004, Mr. Robert W. Holloran described a biometric-supported name-based criminal history system for background check. This application filed as U.S. Ser. No. 11/187,391 is directed at eliminating false positives or false negatives in relation to criminal history files under the FOIA. To reinforce the existing systems based on Social Security Numbers and known current and past addresses, an applicant provides a copy of biometic information, such as fingerprints, to help reinforce the search.

Figure 2:
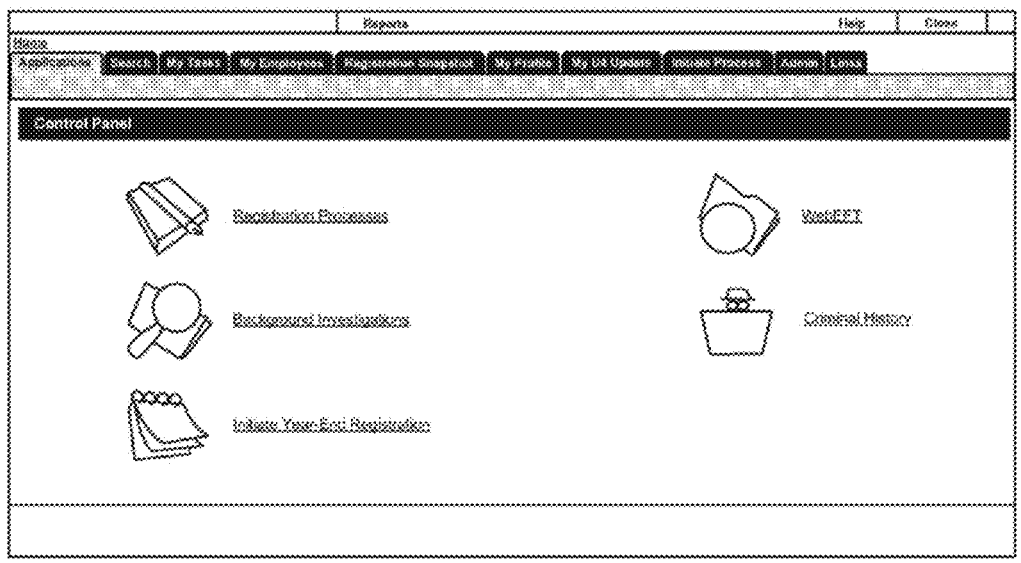
FIG. 2 is a second illustration from the Prior Art.
Figure 2:
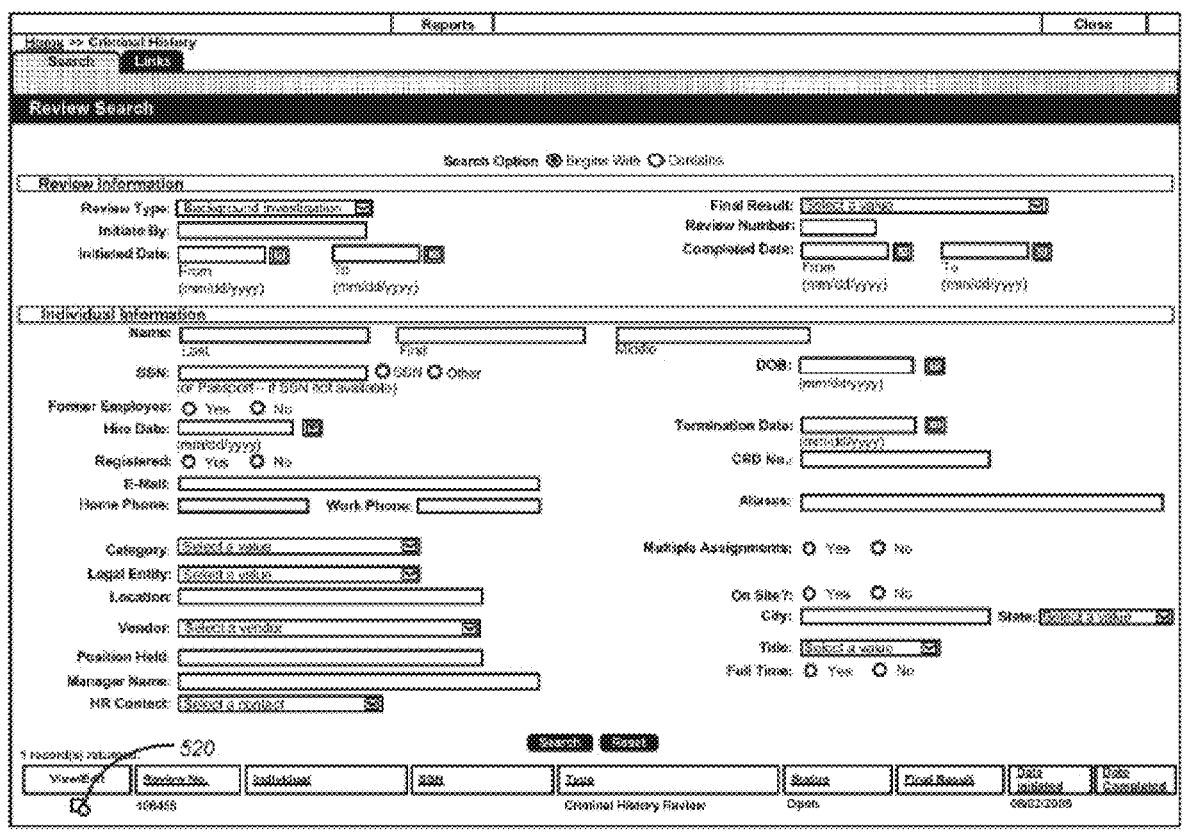

In 2006, Mr. Bari Havlik invented a new system and method for providing for regulatory compliance; a patent was issued as U.S. Pat. No. 8,799,243 in 2014 to Charles Schwab & Co., Inc. On the software control panel, several sections are provided and shown as FIG. 2 demonstrating how information is entered into this new software. This system describes how a "background investigation process" is automatically launched by the system for any known applicant entered into the human resources system. A search criteria is also entered and this system is simply connected to multiple databases; information is collected and stored locally for later access as part of the process. This may include information pulled from a regulatory agency's database such as CRD (compliance regulatory database maintained by and for regulatory agencies), the subject's credit information, and any court records, criminal history, employment history verification, education verification, and insurance, licenses and certification information for the person. Specific background investigation notes for the individual can also be included. For an ongoing open investigation the person(s) conducting the investigation will also be permitted to update background information on this interface page, and this information will be stored in the compliance database. What is known is the automated process of using an applicant's name to collect information from multiple databases connected to a single collection source.

Figure 3:
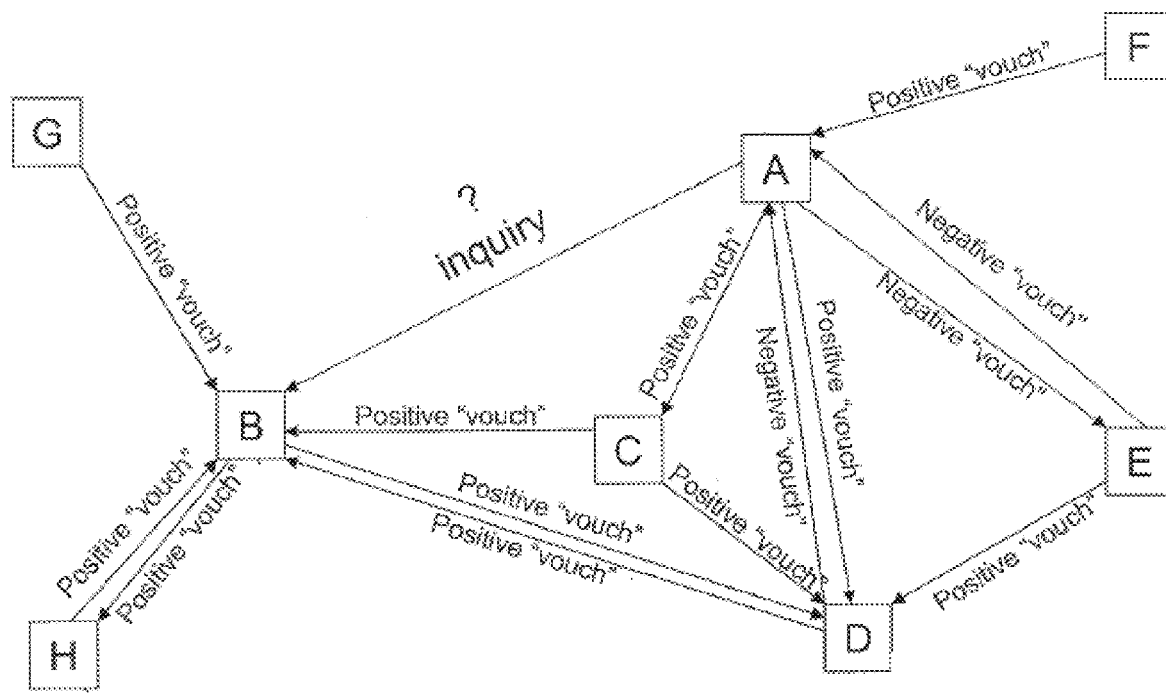
FIG. 3 is a third illustration from the Prior Art.

In 2008, Mr. Chad Williams described a method for assessing the reputation of individual using "vouching" by individuals. In a network environment, some software platforms like LinkedIn®, dbuz® or zoominfo® can be leveraged to create 2nd degree interaction to help get background information on a potential applicant. As part of the method, multiple attributes are listed to help secure this information (e.g., perfectionist/sloppy, embraces change/rejects change). FIG. 3 shows an embodiment of this prior art.

Finally, in 2012, Mr. Tyler J. Miller invented a web-based software system generally designed for processing pre-employment background investigations. This technology issued as U.S. Pat. No. 9,070,098 in 2015, and describes a software branded as eSOPH™. Generally speaking, this technology describes multiple steps associated with a method of using a computing device with processor to manage information or a medium having stored thereon software able to perform such method.

The technology of Miller teaches how a system requires four inputs, (a) information identifying the applicant, (b) the position in the organization for employment, (c) the contact person at the organization, and (d) the contact information of an investigator. This information in then stored as a hyperlink (i.e., HTML address) which is then sent to the email address of the applicant. The link includes a way to view electronic documents by the applicant. The applicant is then queried and responses are received in regards to a "first reference" which is defined as a person likely to have information about the applicant via an email contact address of the first reference. The system then analyzes the type/class of the reference and a second hyperlink is sent to the reference for contact with another set of documents linked with the position. This information is then received and stored for reference in the memory. Finally, a residential address is secured from the initial applicant response and law enforcement agency lists are generated based on the address and these data are sent to the investigator.

In essence, Miller teaches a partially automated system in which a person subject to the background check is in charge of much of the process. This applicant provides personal information, an email address and a location of residence. The same applicant also provides names of references and the system queries these people, stores the information and performs some internal research at locations linked with the address given.

One of the key problem with this method is the ease with which an applicant can circumvent this system. Background checks are designed primarily to uncover information that an applicant does not want to disclose or may be trying to hide. This system places the applicant in control of what information, address, or name of reference is given to the person running the background check. Understandably, those who have circumvented the law in the past or know if a true background check is conducted, something in their past would block the offer of a job and may provide an incentive to manipulate this system in one of many ways. For example, the applicant may provide false information, a false residence address, or a reference which has been carefully kept away from any wrongdoing of the candidate.

What is needed is an improved background check system which avoids some of the pitfalls described above.

SUMMARY

This invention relates to the field of labor and employment, and more specifically the process and method of conducting background investigations, clearance searches, and other employee-related qualification of individuals or job applicants, and the creation of different tools and indexes linked with such process and optimization scheme. The system utilizes biometric feedback from an applicant, a downloadable App to be used at the applicant's device and the integration of tokens and statistical scores and ratings to help improve and lower the cost of the process.

DETAILED DESCRIPTION

Usefulness

As shown in the background above, making sure a person has the proper credentials from an academic, work related, or moral standpoint is critical to the success of any corporation or government entity. In today's world, with social media, the hire of a person who should have been "vetted" and has in contradiction may result in embarrassment or. For example, if an employee is hired by a school and in the background of this person can be found either a criminal conviction having any type of relationship with children or even civil a claim linked with children, then the mistake of failure to vet the individual will result in potential liability on the school. The usefulness of a new process for cost and time optimization and accuracy of information discovered during a background investigation of applicants has multiple important uses of which none are abstract.

For example, the cheaper the cost of any service to perform a background check, the more information can in fact be collected and the more efforts can be expended vet the application. If, as part of the process, four hours by an investigator can be spent, using an enhanced system may result in five hours available to the investigator. With increased time of service, more issues can be uncovered and the check's reliability and capacity to vet individuals are improved.

In addition, by lowering the cost via improvement, more background checks may be performed for any position. For example, if a school has a budget of $X to conduct the background check and the price of a single check is $X, then the school will select an applicant and once selected the background check will act as a simple formality.

Another use, as explained above, is the quality of the information and the efficiency of the background check linked with this novel process. By having a system which is less dependent on disclosures of the applicant himself/ herself, the usefulness of the entire vetting process is greatly enhanced. In addition, the cost and time optimization of background investigations as explained below is made possible via the new technology systems implemented. The prior art discloses how, many years ago it was known how to aggregate data, process it, and use different emails and links to generate a process. The below-described process takes into consideration the prior art and improves substantially from this art. It offers a new and non-obvious way of conducting background checks and offering services which greatly depart from known ideas.

The Basic Types of Technology

Four major fields require the technology described in the current patent, (i) employers, (ii) the government, (iii) education institutions, and (iv) landlords. Currently the need for a background check service can be found in employment solutions which in turn call upon data from the National Criminal File, International Criminal File, County/Federal Criminal/Civil Records, Drug Testing, Previous Employment Verification, Professional License Verification, Biometric Fingerprint Scanning, SSN Verification, OFAC—US Patriot Act compliance, Education Verification, or Applicant Tracking & Recruiting Solutions. Governments also require multiple solutions including Background Investigations, Criminal Records, Credit Reports, Identity Validation, Motor Vehicle Records, Employment, Education, License and Reference Verification, Primary Source Gathering (Public and Restricted Records), Adjudication Support, In-person Investigations and Interviews, and Preliminary Security Clearance Investigations.

Colleges and other education institutions also have need for Background Investigations, Criminal Records, Credit Reports, Identity Validation, Motor Vehicle Records, Previous Employment Verification, Education, License and Reference Verification, Primary Source Gathering (Public and Restricted Records), Adjudication Support, In-person Investigations and Interviews, and Preliminary Security Clearance Investigations. Finally, landlords have need for Background Investigations, Criminal Records, Credit Reports, Identity Validation, Motor Vehicle Records, Employment Verification, Education, License and Reference Verification, Primary Source Gathering (Public and Restricted Records), Adjudication Support, In-person Investigations and Interviews, and Preliminary Security Clearance Investigations.

Figure 4:
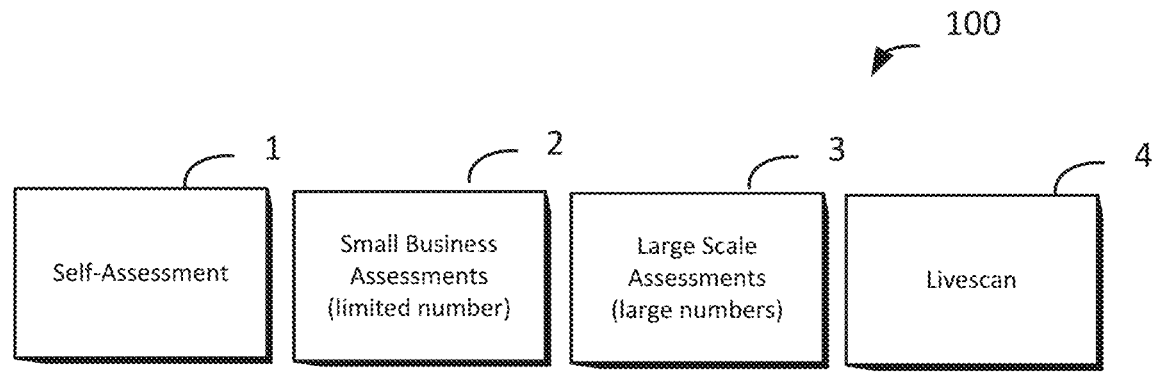
FIG. 4 is a block diagram illustrating the different assessment services which can be offered to different third parties as part of the field of offering background investigation, clearance searches and other qualification of individuals according to one embodiment.

FIG. 4 shows background check services 100 broken down in four main types of background testing 1, 2, 3, and 4 that may be offered concurrently or to different customers. These include self-assessments 1, small business assessments 2, large scale assessments 3, and live assessments 4. Each is reviewed with greater detail as part of FIG. 5.

Figure 5:
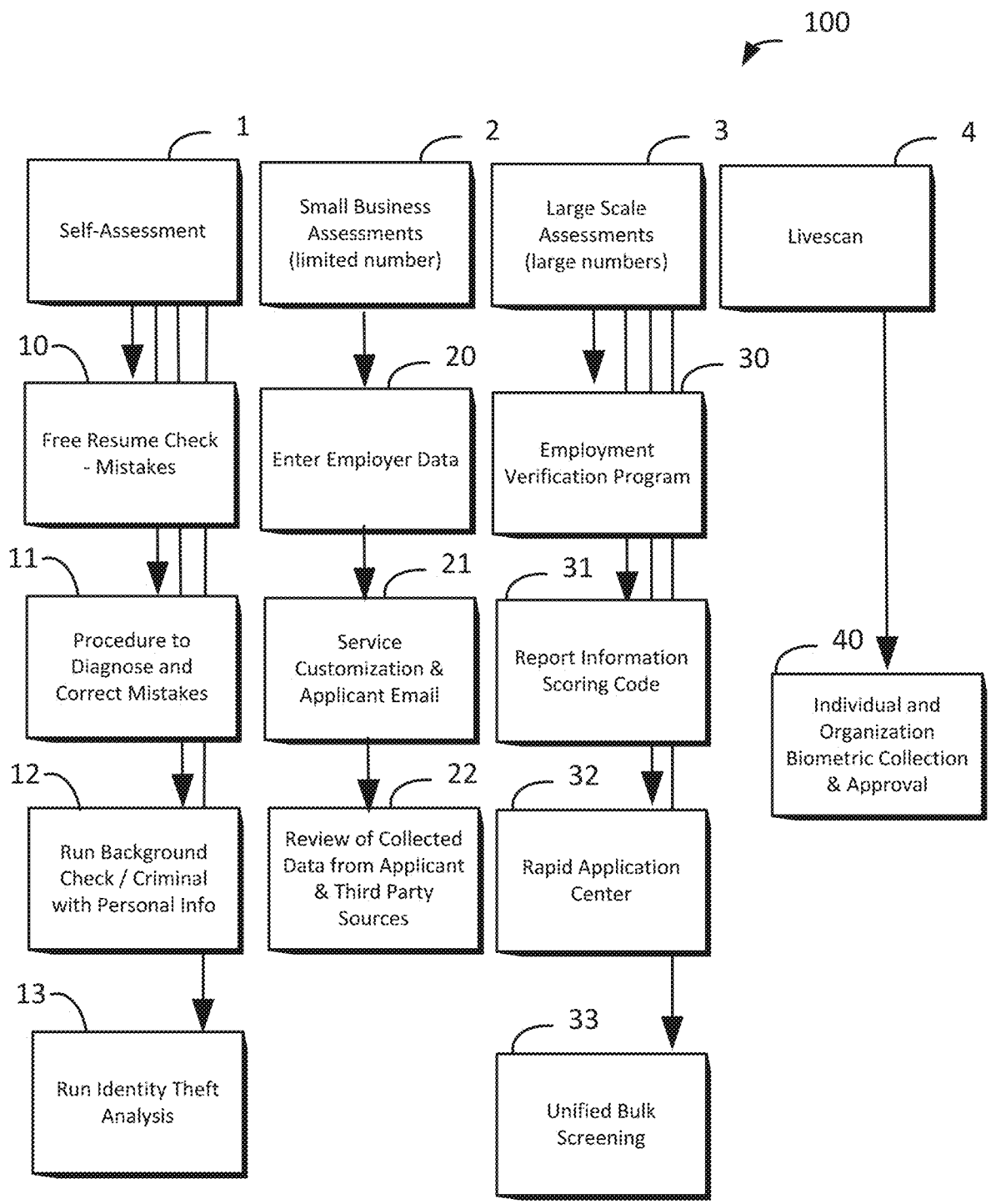
FIG. 5 is block diagram illustrating pull-down suboptions of services of the categories shown at FIG. 4, according to an alternative embodiment.

FIG. 5 shows in a pull-down menu, the different pieces of services and/or processes of which can easily be implemented. As part of the self-assessments 1, different people or individuals can be offered the service which allows individuals, prior to employment, to use technology and uncover information most likely to be uncovered by a potential employer using the platform. Element 10 shows how people can simply upload a resume and ask the platform to check for mistakes and errors which ultimately may have negative side effects during the process of checking a background. One simple example is the Social Security number. A person might include on a resume at the request of a government official the Social Security number which can be run when compared with the name given on the resume. This will confirm if in fact the correct individual is listed under that number. Another example may be the name and address of residence. As part of a credit check, sometimes old credit cards may be located at different addresses and the same can be said for driving licenses and related infractions. Element 10 is a service which allows individuals to confirm the information to be provided.

Element 11 is a tool that allows any one individual to secure most of the information which can be uncovered in an initial brush in some key databases by an employer during the background check program. Element 12 is a more detailed search of certain key metrics of a person's own data by selecting only a handful of databases. For example, a person may know in the past a bankruptcy was needed to liquidate creditors. A person may simply run a credit report as part of the background check and then watch the result of the search. On a letter attached to an application for employment, the person might find it more honest to simply address the bankruptcy and give reasons why the credit score is so low. By taking such proactive steps, a person may help the process improve. Finally, at Element 13, the key modern issues with data are identity theft and misappropriation. By using such tools, a job applicant may self-verify the capacity to control that information.

FIG. 5 next lists the small business assessment solutions 2. In these cases, a party has a limited number of needs linked with hires. In many cases, the number of yearly background checks and screens may be manageable on a monthly basis (1 to 20). In those cases, as shown, the employer is asked to upload and enter its own employer data 20. The service will then different basic boilerplate communications and emails to these applicants 21. Finally, the information is reviewed and collected from third-party sources and presented to the employer 22.

In the case of large uploads 3, for example large entities which will conduct hundreds of searches, the process must be more automated and the review process must also be improved to allow the different results to be sorted. As part of 30, an employer verification can be conducted generally. Then 31 a quick glance RISK flag and color-coded system can be used to help manage the results. At 32, workflow technology allows candidates to submit information and initiate the checks order by eliminating the need for the employer to conduct this review. For example, schools are likely to benefit from this type of solution. At 33, a bulk screening system allows lists of candidates to be submitted via an API for management of the data for recurring processes. Finally, Element 4, allows for quick portal information for the processing of information such as fingerprint analysis for travel, immigration, carry and conceal permits, and court-related matters.

The Hardware

Figure 6:
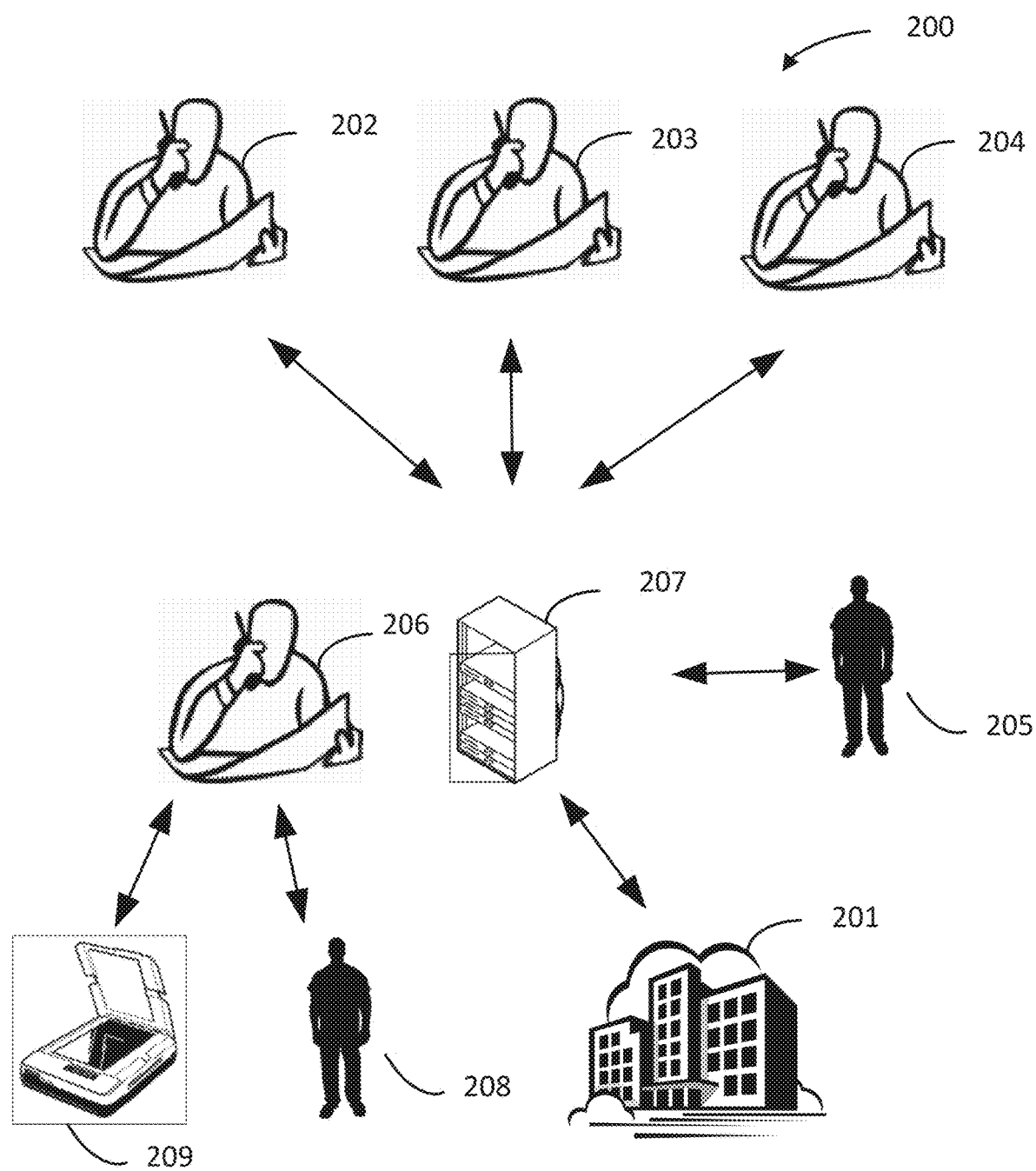
FIG. 6 is a general illustration of the different actors engaged in the process of the use of the services described here, according to an embodiment of the present invention.

As is the case with most processes and cost-reducing solutions these days, hardware can be used to help implement the different steps of the above-described system, process and method. FIG. 6 is a general illustration of the different actions of implementing a process 200 for cost and time optimization of background investigation of employment applicants, according to an embodiment of the present invention. At the heart of the system is an employer 201 such as a school, a government agency, a corporation or even a private individual. While a handful of employer or service needs is shown, what is contemplated is the use of any potential group which uses the need for the below-described services. For example, the employer 201 can be a school, the immigration agency of the U.S. government, a local government, or a corporation which may require such service.

Multiple applicants 202, 203, and 204 will apply for the job or request the services from the employer 201. An employer representative 205 is often tasked with the job of helping with the selection and the employment of an individual 202, 203, and 204. As shown, often the employer 201 will use a third-party service provider 206 specialized in background checks and screening. This party often will dispose of electronic tools 207 described with greater detail hereafter 207 generally, in-person investigators 208, and other equipment 209, for example a fingerprint scanner or other hardware.

In an embodiment, the system 200 as shown is app-based or software-based and resides on a server 207, allowing one or more job seekers 202, 203, or 204 to exchange information with the service provider 206 via the system 207 for performing the process to satisfy the need of the potential employer 201 or the representative 205. As shown, the process and associated hardware 200 may include the different actors accessing the system using different types of electronic devices.

Figure 7:
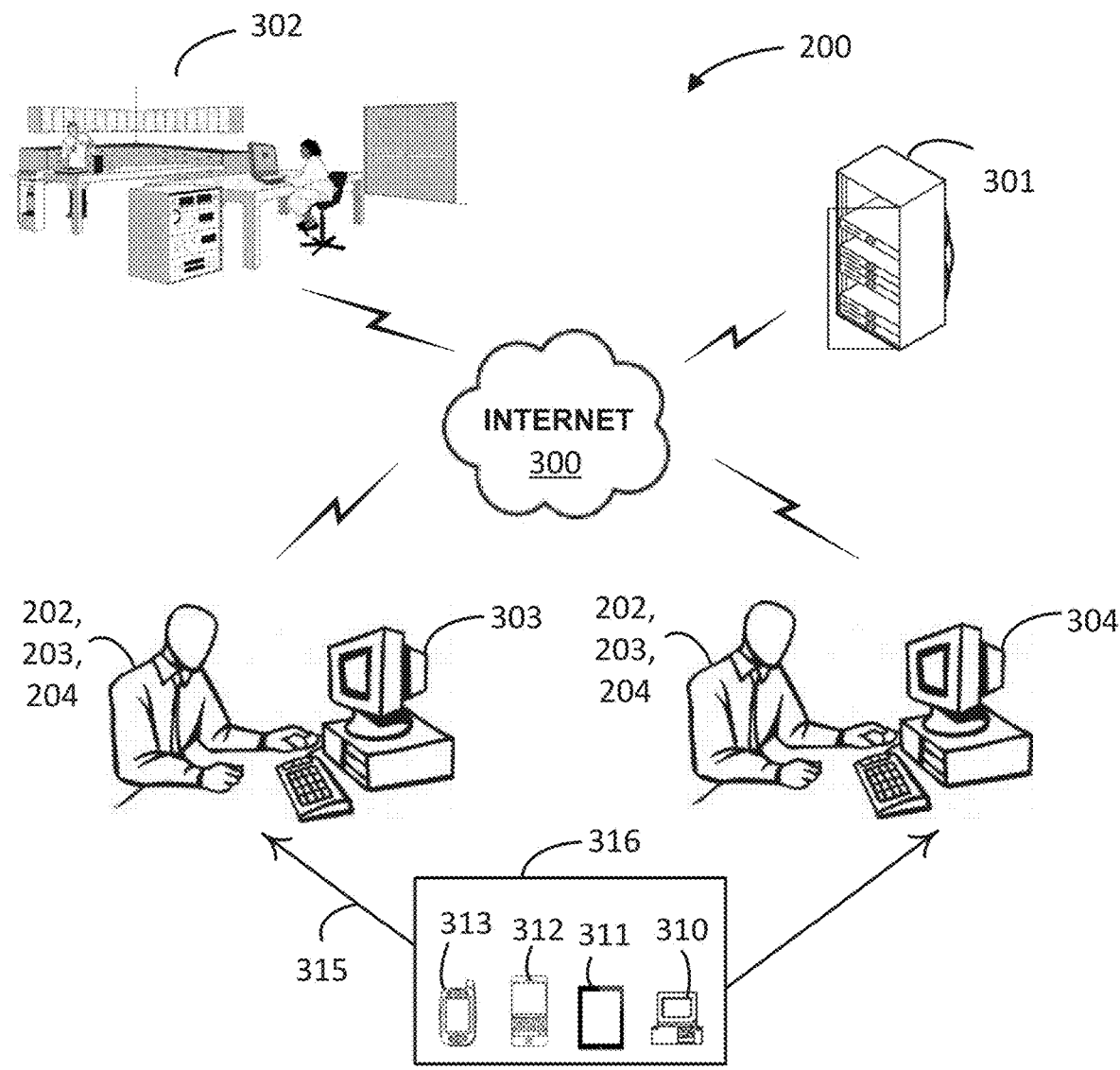
FIG. 7 is a schematic illustration of possible hardware used in a network configuration.

FIG. 7 is a schematic illustration of possible hardware used in a network configuration as shown with different computers. Back in 1990, when the Internet was made available to the public, few were familiar with the general interconnectivity of the hardware elements used in any platform or system 200. To enable patent applications, much description of the interconnectivity of these elements became necessary. With time, those of ordinary skill in the art realized how each of these elements and pieces, either in hardware and/or software, operate. To help with this disclosure, what is described hereafter is one configuration of how different elements can operate in tandem.

FIG. 7 shows at the center 300 how the Internet can be used as the medium of communication using, for example, the HTML protocol. Other networks are also contemplated; for example, wireless networks, internal networks, or other non-HTML networks. As the current platform and system or process are expanded and new technology arrives, one of ordinary skill will know that the concepts shown herein can be applied to other networks, and to new technology as currently used over the Internet and wireless networks.

Shown is a remote data server 301, used sometimes to store data used by any software application. For example, in recent years Cloud technology allows for more fluid data management by relying on a network of servers 301 located in different physical locations around the world. As shown, different rooms 302 are connected to the Internet to help manage the system, offer users rights and manage the flow of data. As shown, different pieces of electronics 303 and 304 are, in turn, connected to the Internet 300 using their own communication protocols to help large numbers of users obtain access. As shown, the users may be individuals 202, 203, and 204, as shown at FIG. 6.

To help the reader understand, while the illustration shows desktop computers 303 and 304, over time users have become more familiar with less bulky systems and equipment capable of also accessing the Internet 300. For example, today's wireless phones now offer almost full surfing capabilities through browsers and double capacity transceivers. As shown, users 202, 203, and 204 can use a desktop 310, a tablet 311, a smart phone 312 or a simple cell phone 313. In each case, the users 202, 203, or 204 simply connect 315 the device 316 using access and password features on a software layer. What is not described but is known is how the different ports and communication protocols interconnect using normal connectivity technology. For example, modern tablets can connect through wireless connection, data connection over phone networks, by using Bluetooth®, or by any other data transfer standard.

The Software

Figure 8:
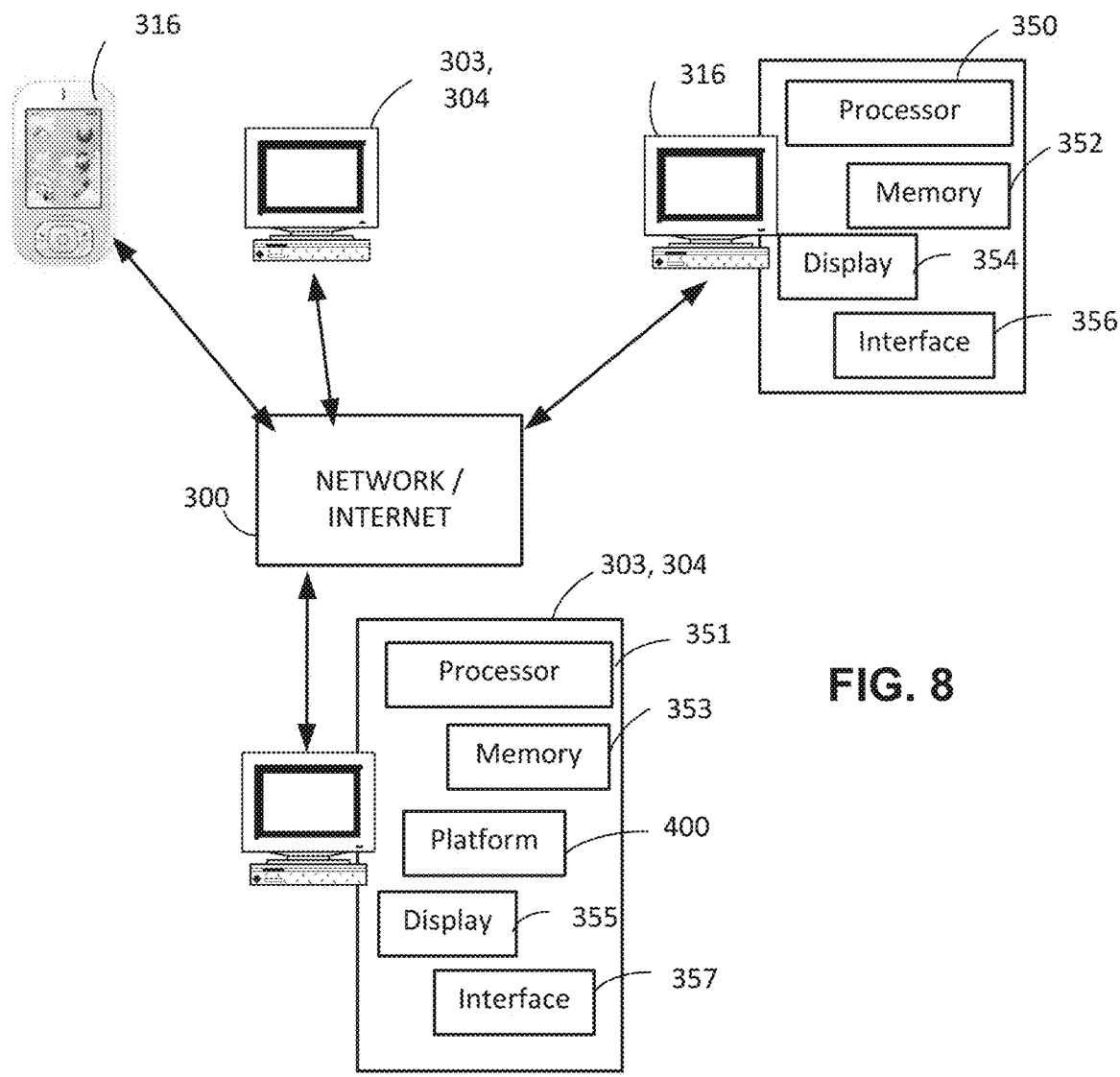
FIG. 8 is a schematic illustration of the different internal hardware layers needed to process information by the different hardware elements shown at FIG. 7 for use as part of the system shown at FIG. 6, according to an embodiment of the present invention.

Now that the general structure of the different actors as shown at FIG. 6 has been explained and the overall network configuration of hardware 200 as shown at FIG. 7 is accessed by these different users, we will next explain how each of the devices 316 can host and empower multiple types of software to operate within these devices alongside (when needed) phone communication. FIG. 8 is a high-level schematic of the different internal hardware layers used to process information by the different hardware elements shown at FIG. 7 for use as part of the platform and system shown at FIG. 6, according to an embodiment of the present invention.

As shown at FIG. 8, are the different elements 316, 303, and 304 connected to the network 300. What is illustrated is how each of these devices has at least one processor 350, 351 which requires memory 352, 353 to operate. On the memory is written software instructions, and each of the devices relies on multiple layers of hardware technology which operates to empower ports, clocks, and other key features including providing the capacity to run programs in memory and then execute the program in a way which can result in output to be processed by the system. These devices also generally have a display 354, 355 of one type or another to interact with the user, and also have an interface 356, 357 of one type or another such as a keyboard or a mouse, to help exchange information with the user. As shown, a software-implemented platform 400 or system or executed software used in the current invention is shown on the device 303, 304, and 316. This is designed to illustrate generally software applications executing on the device 303, 304, and 305 for one or multiple uses. While this description is broad and general, at the current moment in time it is sufficient to empower one of ordinary skill to understand how the below-described system will be implemented without undue experimentation and testing.

Figure 9:
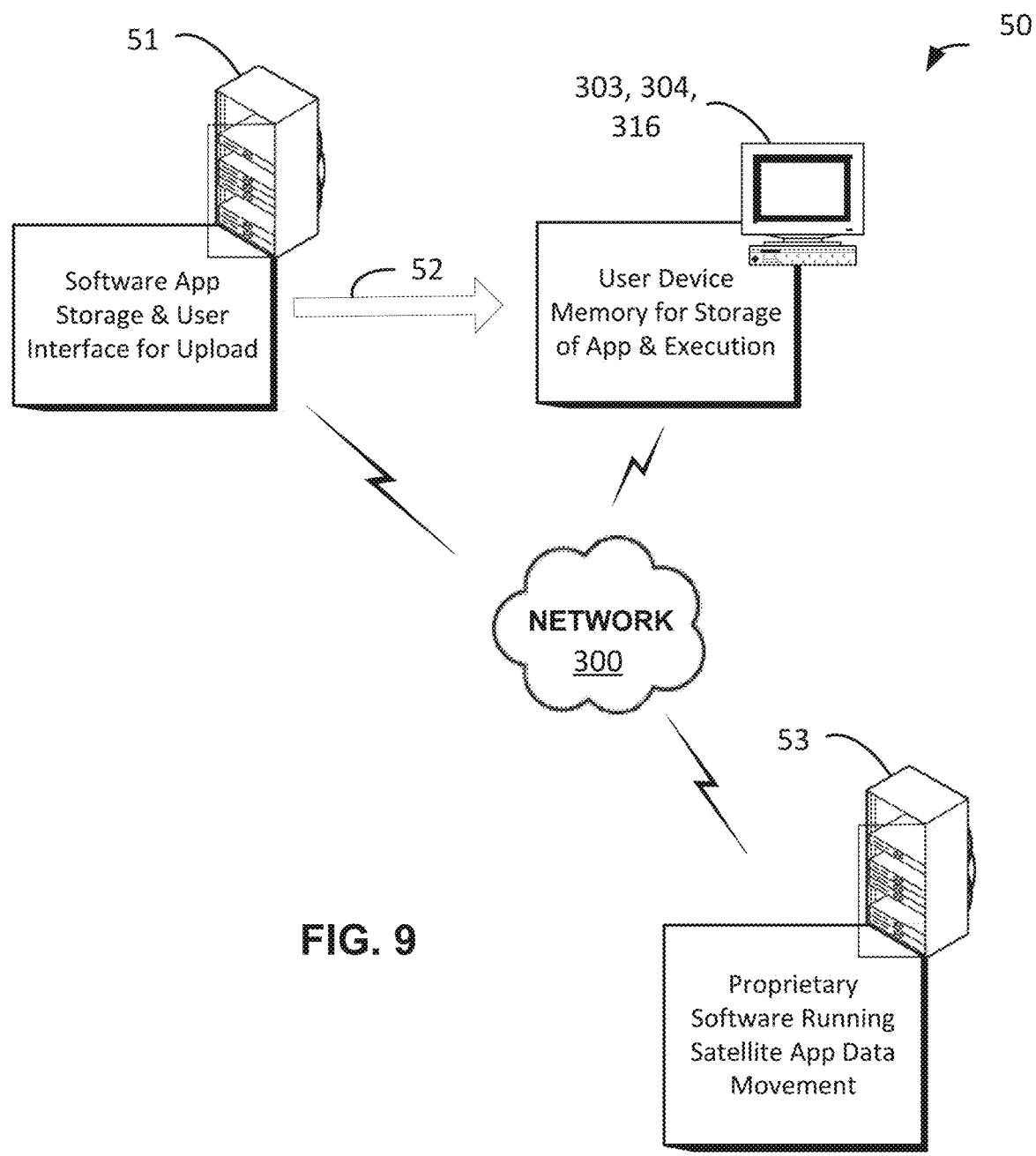
FIG. 9 is a schematic representation of how software, such as an app-based software, can be used over a series of network servers to help enhance the software layer of the different hardware elements shown at FIG. 7 for use with a platform as shown at FIG. 6, according to an embodiment of the present invention.

Recently, with the expansion of connectivity to handheld portable devices, software which once was confined to desktops or servers now has migrated to these devices. A remote store on a server houses multiple "apps" (i.e., an executable file in .app format) which can be uploaded directly by a user into the memory of a portable device for execution. Most of these apps then connect via wireless technology to a remote server where the main software application resides and operates. These apps often serve as satellite software capable of interacting with a remote base for multiple functions. Since this technology has greatly expanded in the last decade, FIG. 9 is a schematic representation of how software, such as app-based software, can be used over a series of network servers to help enhance the software layer of the different hardware elements shown at FIG. 7 for use with a platform or the system as shown at FIG. 6, according to an embodiment of the present disclosure. As for the above-suggested embodiments, this one is simply illustrative and not designed to limit the platform in any way.

Apps, once they are programmed, are uploaded using an online portal onto a service provider; for example, the App Store® from Apple®. This is shown at FIG. 9 as server 51. Users will then access the server 51 via the network 300 and, using their own devices, upload the App 52 required from the server 51. Once added to the memory of the device 303, 304, 316, the App will be executed and an icon-based interface will help a user launch the App locally. Using the network 300, once the App is launched, it will reach out to a second remote server 53 where data stored on the main software executes and is in contact with other parts of the system. Since this technology is rather new, it is expected this process of sharing and managing apps locally and remotely will evolve with time.

Currently, many software programs use a local HTML browser installed on the computer, along with their associated displays and interfaces, for example tablets, cell phones, portable or fixed computers with a commercial browser tool such as Internet Explorer®, or Mozilla Firefox® to exchange information for the most part in the form of HTML script and data linked with the HTML script and display based on the format of the browser. The platform software and associated system and process of use 50, while programmed in any of multiple programming languages, relies on any one of multiple database tools, and can be made to read and generate content that can be accessed by the remote HTML browsers.

The Retention During the Hiring Process

Each field of hiring is different as to how potential candidates will interview, what type of information may be given, and the delays associated with these different applications. For example, certain people wish to be hired by the Federal Bureau of Investigation, understandably, the process of vetting individuals as part of this hiring process may be long, but in the case of teachers or police officers, more applicants may come forth and these different applicants may have more problematic or diverse backgrounds. For example, some statistics offer that while open enrollment in the police force may result in about 14,000 individuals being interested at month 1-2, about half will actually show up for a written test and an interview. Of these, about half will qualify and will be required to do fitness, drug and fingerprint tests resulting in only ¼ of the candidates remaining. These applicants are then sent to bulk background investigation testing. As a consequence, up to ¼ of all applicants must be vetted by a system. This process may be very long and very costly.

Once the background check is in process for these 25% of initial applicants who are vetted, a fraction of them are then requested to attend medical exams, fitness exams, and psychological exams. Finally, only a smaller set is asked to come to the academy. Arguably, a process from the art which is burdensome and requires the transfer of multiple layers of information, uploading of information and downloading of information, along with multiple representations by the applicant places a burden on the investigator and the system of verification of the proper identity of the applicant.

The Method and Steps

Figure 10:
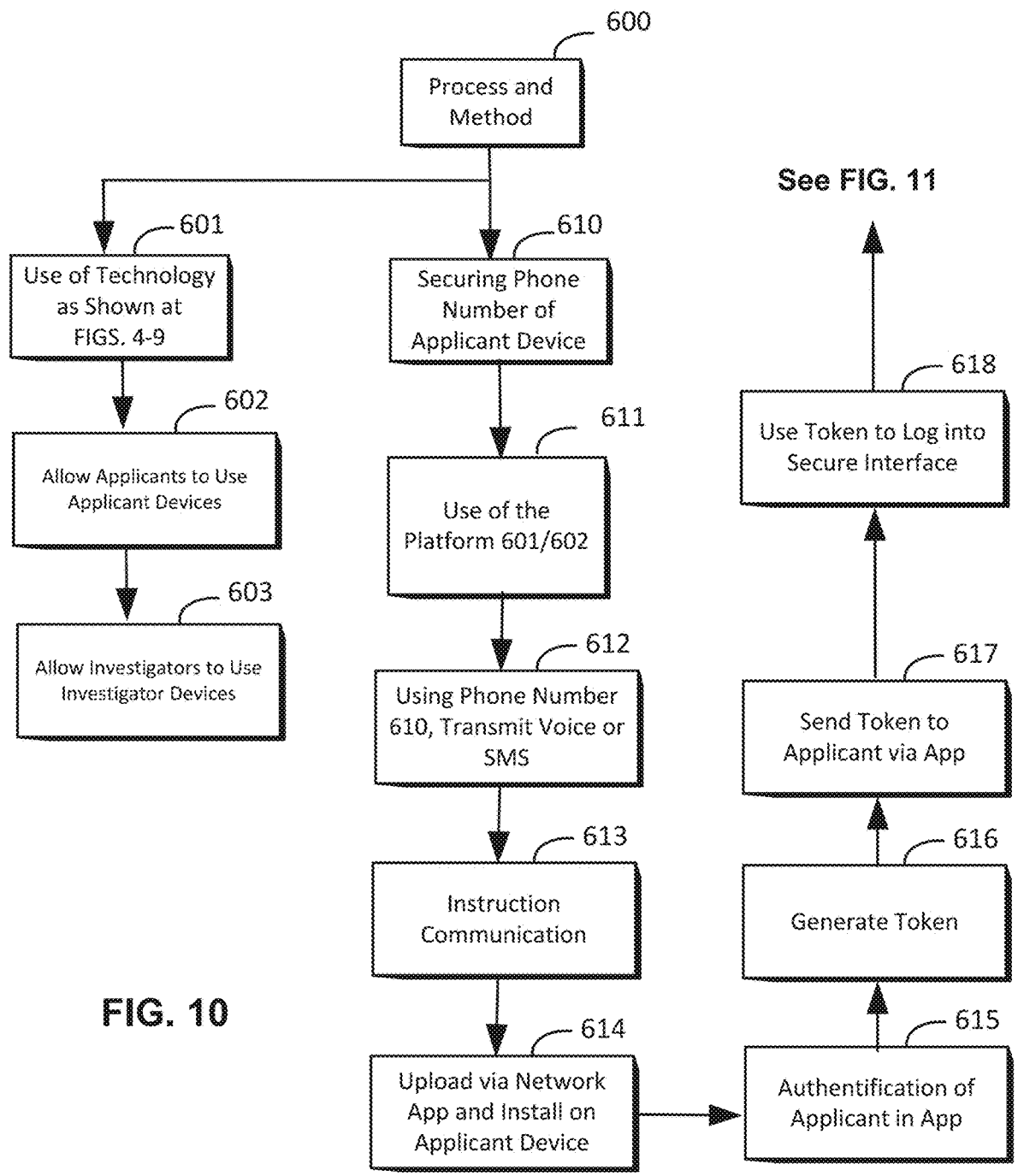
FIG. 10 shows a block diagram illustrating the different steps of the process for cost and time optimization of background investigation of employment applicants.

FIG. 10 shows generally the different steps 600 used as part of the process for cost and time optimization of background investigation of employment applicants. Unlike the technology described in the prior art, the current technology is designed to limit the input and bias from disclosures from an applicant while at the same time not placing an excessive burden on the investigator. A process and method which require less exchange of information, are enhanced in speed and expediency and will result in lower implementation costs and additional usefulness. In the above example, more applicants can be vetted using the technology if it requires less time and cost.

First, the use of biometric information by a user may now be made possible via mobile device sensors. Early systems were linked with a password, a two-step password, or some other type of information available to only one user. Older generation iPhones like version 6 or 7 were sold with thermal fingerprint technology. In this technology, a user programs the interface to recognize his/her finger print by placing their finger on the sensor to store locally a set of data which is linked with the user to "open" or have access to the device or other apps. Once the user's biometric information is stored for the function of opening the device, third-party App users may simply request a user to "identify" themselves using the biometric information. While in theory the biometric lock can be circumvented by buying a new device and programming the device with an impersonator's information, this remains rare and costly. New iPhones® from Apple® use as part of the iPhone 8 or 10 a 3D face recognition algorithm which recognizes certain features of the face of the user. As part of the information collected by the system, the biometric information may be retrieved and stored for later retrieval and access.

At the start of the process 600, which uses the platform shown generally at FIGS. 4-9 (see 601), both applicants and investigators are given access to their devices 602, 603. The first step requires securing 610 from a potential employer in need of a background investigation of an applicant a phone number of the potential applicant. As explained above, in today's technology most applicants for any position now own a portable device, such as a phone which is connected to a network and capable of both wireless phone, internet phone and browsing. These hand-held devices 316 shown at FIG. 7 are very versatile and, broadly speaking, are now able to help significantly as part of any process of checking a background. The primary way to contact the user is via a phone number (i.e., a 10 alphanumerical set). International conventions allow contact to foreign users via a longer set which includes a country code making the set up to 15 alphanumerical characters. While the method describes the use of a phone number, what is contemplated is any pre-defined contact key of these devices.

While the current technology could leverage the use of these devices in multiple additional ways, like using GPS localization of the phone, looking at browsing history, looking at stored content on the phone, this use is not, for the moment, contemplated as part of this method and process simply because of ethical and legal issues that may arise. One of ordinary skill will understand that an applicant may agree to give access to some or all of the content as part of the application process in which case, the content of the phone may be accessed. As described herein, the method does not require the use or access of private or personal information on the device or geo-localization.

On the employer side, the process and associated method provide for the use of a platform 611 with a computer-implemented software system for the exchange of information linked with a background investigation, the platform comprising at least a job seeker device with a network communication capacity for receiving voice communication, direct communication and/or SMS communications using a processor, an interface and a memory in connection with the processor for executing software uploaded from an App server over a network, wherein the job seeker's device has access to the network for communication with a server, at least an employer with a need for a background investigation, and at least one employer-related device with a processor, an interface and a memory in connection with the processor for executing software, wherein an employer representative has access to the server hosting the system for the procurement of services connected via the network, wherein the employer-related device has access to the system for the performance of background investigations, and at least an investigator-held device with a processor, an interface and a memory in connection with the processor for receiving voice communication, direct communication and/or SMS communications as shown with great detail at FIGS. 4-9 and described above.

Broadly speaking, communication between the different pieces of this system evolves greatly over time. Initially, communication modes were preferentially made via voice as many individuals did not know how to use text (Short Messages—SMS). Over time, the use of SMS has spread to a point where most individuals now use the SMS with ease. SMS can be programmed and sent with HTML links and passwords to help access to platforms and information. As part of security processes, users are not asked to rely on cell phone numbers, instead verification codes sent via SMS to cell phones to help brows an HTML interface. One of ordinary skill in the art will understand that what is contemplated and described herein is the use of communication technology which is likely to evolve slowly over the next decades to preferential modes of communication. Currently, the best mode contemplated is sending either a voice or a text message with the information.

In the next step 612 the process transmits a pre-recorded voice, email, or SMS communication to the job seeker using the phone number of the potential applicant that was entered or given by the applicant. For example, a person will offer 555-545-5000 as a contact number. The system will send a voice pre-recorded message in a way or other sound format file over the WARP system or other wireless system. Today, most voice systems have a tool to read the voice and create a text-based message sent to the user as if the communication had been received via SMS. In another embodiment, an SMS is sent to the applicant instead of a pre-recorded voice message. In this first communication (voice or SMS or other), 613 the job seeker is instructed to download from an App store a custom mobile software application. This set of instruction may be done in multiple ways, and for example include the name of the app, if distinctive, and simply instruct the applicant to surf the app store and find the app, but also a direct link can be of the following:

---

Send SMS
<form onsubmit="sendSMS(this); return false;">
  <input id="phone" name="phone" type="tel" placeholder="(555) 123-4567"/>
  <input link= https://itunes.apple.com/us/app/keynote/id361285480?mt=8>
  <input type="submit"/>

---

Once the user has received the instruction 613, in a subsequent step 614, the applicant can click on the link, index, search and is allowed to install on the job seeker device the custom mobile software application. One of ordinary skill in the art will understand the process of allowing the app, generally an app file to be uploaded from the App Store into the device. The process also allows for execution of the app for initial launch and configuration.

In a subsequent phase, once the app has launched and executed, the software may be configured to require authentication 615 by the job seeker of personal identity parameters. The applicant will be asked several key elements to confirm the application such as place of employment either from a menu or directly as key text. In one embodiment, the user is asked to enter the phone number or other personal information such as age, Social Security number, residence, or other key metric that may be needed as part of the background investigation. The App may also be customized by field of use, for example, one app may relate to law enforcement checks while another may be related to education as shown at FIG. 5. The use of scroll down menus also is contemplated to help entry of personal information. In one case, the App is programmed to recognize the phone number of the applicant and immediately populate and template to the required personal information to be entered.

In a subsequent step 616, the App is designed to connect to the server 301 as shown on FIG. 7 at step 615 and once the information is received, a "token" is issued and personalized to the job seeker having confirmed their identity. Such a "token" may be of any form and format, for example, a key for a two-key code for encryption, or a simple string of characters for database indexing at the server 301. While two types of "tokens" are defined, one of ordinary skill in the art will recognize how the security layer manages how such information is processed.

At stop 617, the token is sent to the job seeker's device for access to a secure software application. The token, as explained above may be a simple alphanumeric code, a hexadecimal code, or even a higher level security code. In the most security-intensive codes, a SSL Certificate can be sent; these are small data files that digitally bind a cryptographic key to an organization's details. These keys help establish secure connections to web servers such as banking servers, government servers, or law enforcement servers. One of ordinary skill in the art recognizes that security/encryption formats is an evolving field and that the described process is designed to develops over time to adapt to the changing needs in security modes and methods.

In a next part of the process, the applicant/job seeker/user is allowed to use one of multiple ways to leverage the token either via the App or even a local HTML browser using access 618 to the server 301 via a new secure software application. For example, the user may simply move to a normal computer interface and not a portable device to continue this process. One of ordinary skill in the art will understand that while two software interfaces are described, they may be combined and even be different portions of the same software.

Figure 11:
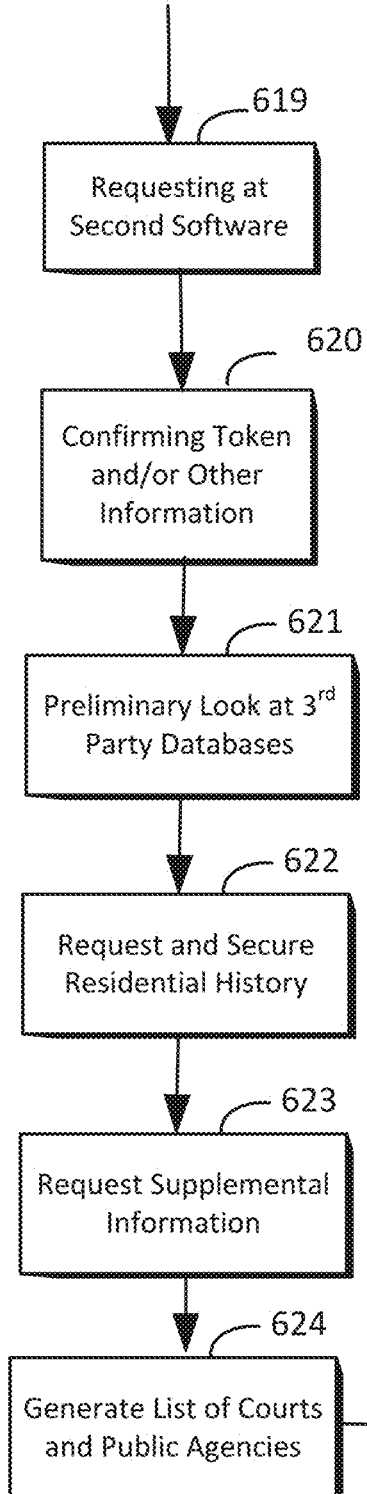
FIG. 11 is a continuation of the block diagram illustrating the different steps of the process for cost and time optimization of background investigation of employment applicants as started at FIG. 10.
Figure 11:
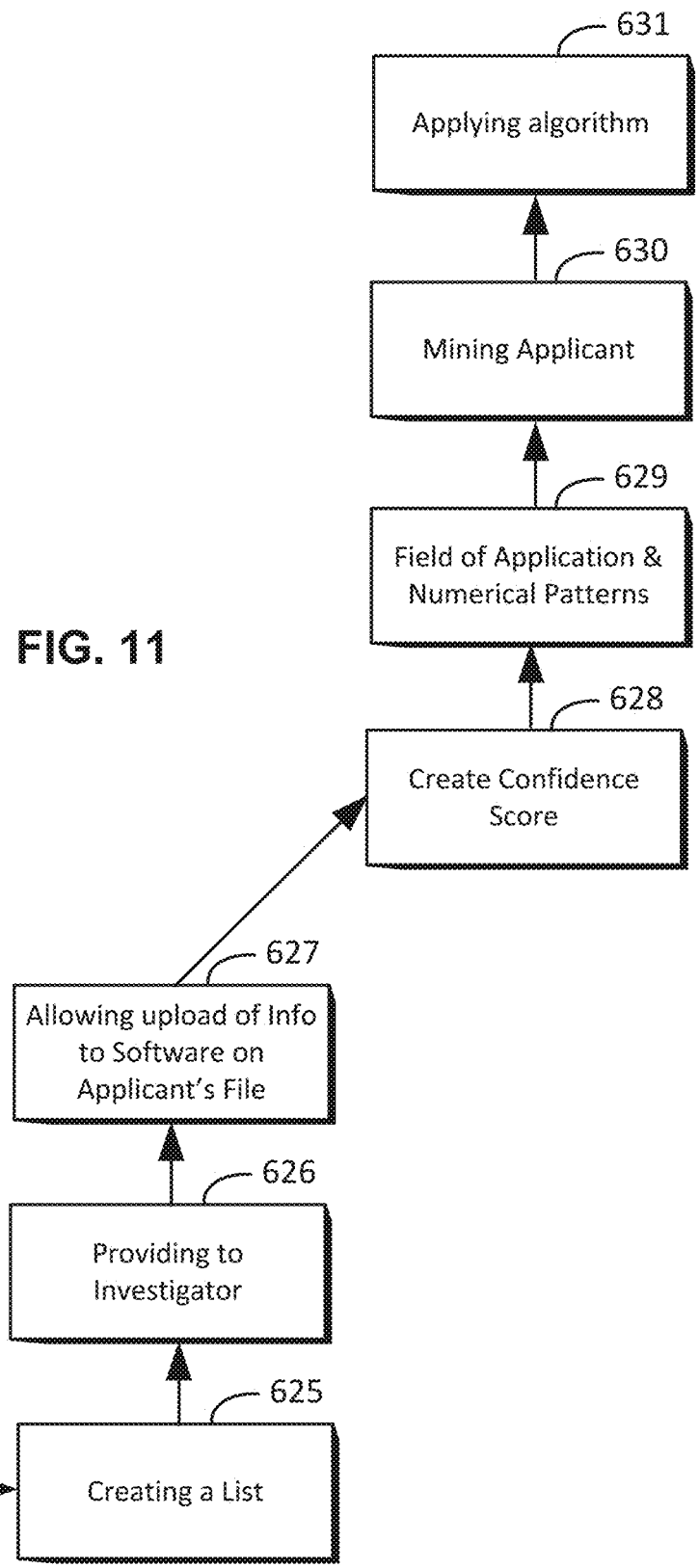

As shown at FIG. 11, a continuation from FIG. 10, at step 619, requests from the job seeker local access and biometric identification and 620 confirms secure software application log-in using both the token and/or the biometric identification. As explained, in a best mode, only the token is required.

In most classical areas of research as to background, information is collected 620 by allowing the server 301, once the user has been authenticated and the information has been given as to personal information, to access third-party databases 621 of many types to uncover a job seekers residential address history. For example, a person might at first return only partial information but after conducting a search of the applicant's potential employment, some key pieces of information can be secured.

Once such information has been secured at 621, in some cases no information will in fact be returned if names are too broadly used, of if the user is requesting 622 from job seeker validation of residential address history. In this part of the process, the applicant is invited to give information which in some cases will corroborate information secured at 621 but in other instances the information given will be the entire set received.

Also part of the process is the request 623 from the subject of the background search for a set of supplemental information. Many types of information can be requested and may, in part or whole, be linked with the field and type of background clearance required. For example, in cases like law enforcement, a person may be asked to list important athletic events, along with relevant diplomas. In heavier-burdened searches, a person may be asked by the FBI to list all contacts, parents, and provide their Facebook® name and page number. In the case of background clearances for layers who are trying to qualify for the bar, even minor infractions of law must be provided and listed as a matter of mandatory disclosure. In the case of legal searches and FBI searches, failure to disclose will result in issues to be raised.

Background investigations often rely on information which is not publicly available. This information may take many forms as being only subjective information obtained by talking with individuals working or living in the environment of the person (i.e., is the person a good neighbor, is the person a good patron of a bar, is the person kind). In addition, charges may have been brought or be too recent or a person might have an unpublished record. By scrubbing third-party databases, this time with either the address or other supplemental information, the system can generate 624 a list of courts and public agencies of relevance based on the validated residential address history. To better understand this notion, say a person applies for a law enforcement job in New York City, and that person provides five key addresses, two in Illinois and three in the suburbs of NYC. In that instance, the system will look at the potential locations of interest where a live investigator would benefit from going physically to secure all available information about a candidate. For example, an investigator might want to visit the Illinois tax registry or City Hall of the Illinois locations where the person lived. In the above example, a person might have listed the NYC addresses first, and most systems would focus on temporal proximity. Investigators of experience will know that the Illinois residence address listed before a state move was made would be more likely to uncover a cause or reason for the move which might contradict the work history of this applicant as found in a credit report or self-disclosure form.

In the next phase 625 the process assembles, in a single source, the list of courts and public agencies, the job seeker's residential address history, and the set of supplemental information. This information is the key input set of information capable of helping an investigator work. One of ordinary skill in the art once again will understand that while information such as profile picture, social media, other online accounts, or even third-party information is not listed, depending on the nature of the investigation and the research, any type of information may be needed to be assembled 625 as part of the list.

In this step 626 provides to at least one investigator using an investigator device the list of courts and public agencies of relevance, along with the personal identity parameters of the applicant, and allows 627 the investigator to upload via his device information regarding the result of the investigation to one or more courts or public agencies. As one can imagine, the software platform is broad and allows for the upload of pictures, images, text, notes, and comments. The system also allows for the creation of new leads and input of this information.

Statistical Confidence Score

The above processes, steps and system use allow for a background check of an applicant to conduct and help the process using app, Token, and Secured Links to optimize a process in the art. Unlike what may be believed, this new process is not simply an abstract idea or known obvious steps of implementation of technology. Such technology has been available for nearly a decade yet no one has assembled these steps in the precise arrangement currently described herein. This process allows for the optimization of costs and time, but at the same time and more importantly, places the applicant in a very unique position. While the applicant is asked to provide information through his device, the process assumes this applicant must not be trusted. The method and process do not allow any given applicant to take control of the disclosure process. The method and process, is novel, not an abstract idea and provides substantially more than other systems on the market. Using this process, reliability is greater and the cost efficiency of useful information uncovered is greater.

In a further effort to help narrow costs and improve this process, the same way scores may be used in other areas (like a FICO credit score), a normalized score system is contemplated. In one embodiment, the score is normalized (scored from 0 to 100) or is fractional (score of 0 to 1) based on the process of the information. FIG. 11 at 628 shows the steps of using the platform to generate a statistical confidence score.

While these scores can be determined with any known method, the proposed confidence score 628 wherein the statistical confidence score is created using a scaled score design based on first determining a field of application, conducting a numerical analysis of at least two preferential patterns within the field of application 629 for determining filters, mining the applicant's 630 own information for the at least two preferential pattern behaviors, applying a matching algorithm 631 between the two preferential patterns and the at least two preferential pattern behaviors, and generating the statistical confidence score based on the algorithm. In one case, the field of application is education hire, and the at least two preferential pattern behaviors consist of the number of extracurricular activities, duration of past employment, and academic recognition in extracurricular activities.

By way of the numerical example, in academia teachers may be found to be valuable and good for hire based on the type of school they have worked at (i.e., TYPE=public (0), semi-public/private (0.5), private (1)) or the number of years of experience (i.e., EXP=from 1 (0 to 30 (1 range) years). These factors are particular to the field of academia at a low level (e.g., high school). Other factors might be more relevant for university teachers such as the number of published works (range from 0 to 30+), and the numbers of positive references on the web from a Google.com® search (range from 0 to 10,000). As shown above, these are two factors to be applied. Looking at the database for each applicant, these factors may be run for each of candidates A and B. An algorithm in the above might be a linear distribution of both factors along the ranges added up and normalized. For a teacher working in a semi-public school for 5 years and a private school for 6 years, the score might be:

$$SCORE=100\times(TYPE)+(EXP)$$

$$SCORE=100\times\{[0.5\times5/30]+[1\times6/30]\}=28.3/100$$

These scores allow for applicants to be ranked in very useful ways with a score. Using this score as feedback to the system, when large volumes of individuals must be processed, either the score is used early on to select who must be vetted by the inspector, or alternatively, as part of the report back to clients.

What is claimed is:

1. A process for cost and time optimization of background investigation of employment applicants, the process using a platform and including the steps of:
   securing from a potential employer in need of a background investigation of an applicant a phone number of the potential applicant;
   using a platform with a computer-implemented software system for the exchange of information linked with a background investigation, the platform comprising:
   at least a job seeker device with a network communication capacity for receiving voice communication, direct communication and/or SMS communications using a processor, an interface and a memory in connection with the processor for executing software uploaded from an App server over a network, wherein the job seeker device has access to the network for communication with a server;
   at least an employer with a need for a background investigation;
   at least one employer-related device with a processor, an interface and a memory in connection with the processor for executing software, wherein an employer representative has access to the server hosting the system for the procurement of services in connection via the network, wherein the employer-related device has access to the system for the performance of background investigations; and
   at least one investigator-held device with a processor, an interface and a memory in connection with the processor for receiving voice communication, direct communication and/or SMS communications;
   transmitting an SMS communication to the job seeker device using the phone number of the potential applicant, and wherein the SMS communication includes a link to an App store and a placeholder with the phone number of the potential applicant;
   instructing the potential applicant to download from an App store a custom mobile software application, wherein the custom mobile software application is customized in a field of application, and wherein the custom mobile software application recognizes the phone number and immediately populates a template to a set of required personal identity parameters to be entered;
   allowing the potential applicant to install on the job seeker device the custom mobile software application;
   authentication of personal identity parameters, entered using scroll down menus for the entry of the personal identity parameters in the populated template set of required personal identity parameters to be entered;
   issuance by the server of a token personalized to the potential applicant having confirmed identity;

sending the token to the job seeker device via the custom mobile software application for access to a secure software application, wherein the token is a simple string of characters for database indexing; and allowing the potential applicant to use a local browser tool to access, using the token, the secure software application requesting from the job seeker device local access and biometric identification;

confirming secure software application log-in using both the token and the biometric identification;

allowing the server to access third-party databases to uncover residential address history of the potential applicant;

requesting and securing from the potential applicant validation of residential address history;

requesting from the potential applicant a set of supplemental information;

using third-party databases, generating a list of courts and public agencies of relevance based on the validated residential address history; and assembling in a single source the list of courts and public agencies, the residential address history, and the set of supplemental information;

providing to the at least one investigator-held device the list of courts and public agencies of relevance along with the personal identity parameters of the potential applicant, and allowing upload via the investigator-held device information regarding a result of an investigation to one or more courts or public agencies, using the platform to generate a statistical confidence score, wherein the statistical confidence score is created using a scaled score designed based on first determining the field of application, conducting a numerical analysis of at least two preferential patterns within the field of application for determining filters, mining the potential applicant's information for the at least two preferential patterns, applying an algorithm between the two preferential patterns and the at least two preferential patterns, and generating the statistical confidence score based on the algorithm, wherein the field of application is education hire, and the at least two preferential patterns consist of the number of extracurricular activities, duration of past employment, and academic recognition in extracurricular activities, and wherein the algorithm is a linear distribution of the at least two preferential patterns along the ranges added up and normalized, wherein the scaled score is one to one hundred wherein 100 is the highest confidence score given and 0 is the lowest.

2. A process for cost and time optimization of background investigation of employment applicants, the process using a platform and including the steps of:

securing from a potential employer in need of a background investigation of an applicant a phone number of the potential applicant;

using a platform with a computer-implemented software system for the exchange of information linked with a background investigation, the platform comprising:

at least a job seeker device with a network communication capacity for receiving voice communication, direct communication and/or SMS communications using a processor, an interface and a memory in connection with the processor for executing software uploaded from an App server over a network, wherein the job seeker device has access to the network for communication with a server;

at least an employer with a need for a background investigation;

at least one employer-related device with a processor, an interface and a memory in connection with the processor for executing software, wherein an employer representative has access to the server hosting the system for the procurement of services in connection via the network, wherein the employer-related device has access to the system for the performance of background investigations; and at least one investigator-held device with a processor, an interface and a memory in connection with the processor for receiving voice communication, direct communication and/or SMS communications;

transmitting an SMS communication to the job seeker device using the phone number of the potential applicant, and wherein the SMS communication includes a link to an App store and a placeholder with the phone number of the potential applicant;

instructing the potential applicant to download from an App store a custom mobile software application, wherein the custom mobile software application is customized in a field of application, and wherein the custom mobile software application recognizes the phone number and immediately populates a template to a set of required personal identity parameters to be entered;

allowing the potential applicant to install on the job seeker device the custom mobile software application;

authentication of personal identity parameters, entered using scroll down menus for the entry of the personal identity parameters in the populated template set of required personal identity parameters to be entered;

issuance by the server of a token personalized to the potential applicant having confirmed identity;

sending the token to the job seeker device via the custom mobile software application for access to a secure software application, wherein the token is a simple string of characters for database indexing; and allowing the potential applicant to use a local browser tool to access, using the token, the secure software application requesting from the job seeker device local access and biometric identification;

confirming secure software application log-in using both the token and the biometric identification;

allowing the server to access third-party databases to uncover residential address history of the potential applicant;

requesting and securing from the potential applicant validation of residential address history;

requesting from the potential applicant a set of supplemental information;

using third-party databases, generating a list of courts and public agencies of relevance based on the validated residential address history; and assembling in a single source the list of courts and public agencies, the residential address history, and the set of supplemental information;

providing to the at least one investigator-held device the list of courts and public agencies of relevance along with the personal identity parameters of the potential applicant, and allowing upload via the investigator-held device information regarding a result of an investigation to one or more courts or public agencies, using the platform to generate a statistical confidence score, wherein the statistical confidence score is created using a scaled score designed based on first determining the field of application, conducting a numerical analysis of at least two preferential patterns within the field of application for determining filters, mining the potential applicant's information for the at least two preferential patterns, applying an algorithm between the two preferential patterns and the at least two preferential patterns, and generating the statistical confidence score based on the algorithm, wherein the algorithm is a linear distribution of the at least two preferential patterns along ranges added up and normalized, wherein the field of application is law enforcement services and the at least two preferential pattern behaviors consist of the group of drug use, criminal records, and employment durations, and wherein the scaled score is one to one hundred wherein 100 is the highest confidence score given and 0 is the lowest.

* * * * *